United States Patent [19]
Chow et al.

[11] 4,038,688
[45] July 26, 1977

[54] AUTOMATIC LOW FREQUENCY GAIN LIMITING BY ADDITION METHOD IN VIDEO PROCESSING SYSTEM

[75] Inventors: Sen-Te Chow, Alexandria; Earl M. Thomas, Arlington, both of Va.

[73] Assignee: The United States of America as represented by the Secretary of the Army, Washington, D.C.

[21] Appl. No.: 650,483

[22] Filed: Jan. 19, 1976

[51] Int. Cl.² .............................................. H04N 5/14
[52] U.S. Cl. ...................................... 358/174; 178/6; 178/7.1
[58] Field of Search ...................... 178/6, 6.8, 7.1, 7.2, 178/DIG. 29, DIG. 19, DIG. 34, DIG. 8, DIG. 39; 358/160, 166, 174

[56] References Cited
U.S. PATENT DOCUMENTS

| | | | |
|---|---|---|---|
| 3,591,713 | 7/1971 | Olsson et al. | 178/DIG. 34 |
| 3,813,486 | 5/1974 | Knowles | 178/DIG. 39 |
| 3,935,382 | 1/1976 | Hunt | 178/DIG. 8 |
| 3,936,598 | 2/1976 | Newitt | 178/DIG. 34 |

*Primary Examiner*—Robert L. Richardson
*Attorney, Agent, or Firm*—Nathan Edelberg; Max L. Harwell; Robert P. Gibson

[57] ABSTRACT

A low frequency gain limiting circuit for an AC coupled video processing system wherein if the low frequency portion of video signals exceed a certain level, the low frequency pedestal is clipped and fed directly to a summing amplifier while simultaneously the low frequency pedestal is differentially compared in a differential amplifier with the original video signals and the resulting short pedestal with the high frequency detail remaining thereon is passed through a high pass filter before application of the high frequency detail only at a second input to the summing amplifier. The addition of the high frequency detail back onto the low frequency pedestal within the summing amplifier provides the gain limited video signal. A video signal comprising low frequency pedestals with amplitudes within the certain level are fed directly through the summing amplifier but no signal will be present at the output of the differential amplifier since both signals cancel.

8 Claims, 5 Drawing Figures

AUTOMATIC LOW FREQUENCY GAIN LIMITING BY ADDITION METHOD IN VIDEO PROCESSING SYSTEM

The invention described herein may be manufactured, used, and licensed by or for the Government for governmental purposes without the payment of any royalty thereon.

CROSS-REFERENCED APPLICATION

This application comprises an addition method of automatic low frequency gain limiting in an AC coupled video processing system that is an improvement over the subtraction method described and claimed in U.S. Pat. No. 3,975,586 which issued on Aug. 17, 1976 to John J. Pupich and one of the present co-inventors, Sen-Te Chow.

BACKGROUND OF THE INVENTION

This invention is in the field of AC coupled video processing systems. A problem in these AC coupled video processing systems is streaking, which is caused by one signal overriding or suppressing another signal due to large temperature differences, light intensity differences, etc. emitted from the field of view into the bank of detectors of the video processing systems. Some means is needed to suppress the overridng signals yet retain the resolution, or stated another way, some means is needed to keep the output voltage level confined within the linear dynamic range of the system yet allow the gain of the high frequency detail of the targets to remain unchanged thus preserving signal quality.

The above mentioned cross-referenced application used a subtraction method to suppress overriding signals, yet retain signal resolution. This subtraction method had the following disadvantages. First, the low frequency pedestal edges are not perfectly compensated for when there are large amplitude input signals. The circuit also requires two large capacitors, one 0.35 microfarad and one 0.068 microfarad, which are hard to be integrated and require two external leads therto for each channel. Thus, implementation of the circuits become a problem. The above mentioned disadvantages are solved by the present method.

SUMMARY OF THE INVENTION

The present invention comprises an electronic means that is inserted in the video channels between the last post amplifier and the input to a light display device driver in which the electronic means limits the amplitude of the low frequency pedestal voltage component of the composite video signal at the input to the driver. The electronic means reduces the gain of the low frequency signal component of the video signal when the voltage level exceeds or goes below a pedestal limiting level. The gain of the high frequency component, which rides on the low frequency pedestal component, remains unchanged during the operation.

An object of the present invention is to pressure detail information in the presence of various temperature target backgrounds that cause the low frequency pedestal to vary widely in amplitude.

The electronic means comprises a differential amplifier and a pedestal limiting circuit wherein video pulses are applied to one input to the differential amplifier and the same video pulses are clipped by the pedestal limiting circuit with the clipped video pulses applied at another input to the differential amplifier. The output from the differential amplifier includes only the short pedestal outputs that are the clipped off portion of the low frequency pedestals having the high frequency detail remaining thereon. The short pedestal outputs with the high frequency detail thereon are passed through a high pass filter and clipping circuit where the pedestal is removed, yet the high frequency detail remains. The high frequency detail at the output of the high pass filter and clipping circuit is summed with the pedestal limited voltage in a summing amplifier wherein all high frequency detail is retained since the low frequency pedestals remain within the detection level of the video signals.

DETAILED DESCRIPTION OF THE PREFERRED EMBODIMENT

The streaking problem at the viewing end of an AC coupled video processing system is discussed hereinbelow. First, the composite video signal is an AC coupled video processing system has both low frequency, or pedestal, and high frequency, or target detail information, components included therein. If the amplitude of the low frequency pedestal voltage component exceeds a certain level, explained herein as the pedestal limiting level, streaking of the detail information results. This streaking problem is the result of signal suppression, which is an inherent problem associated with AC coupled video processing systems.

Figure 1:
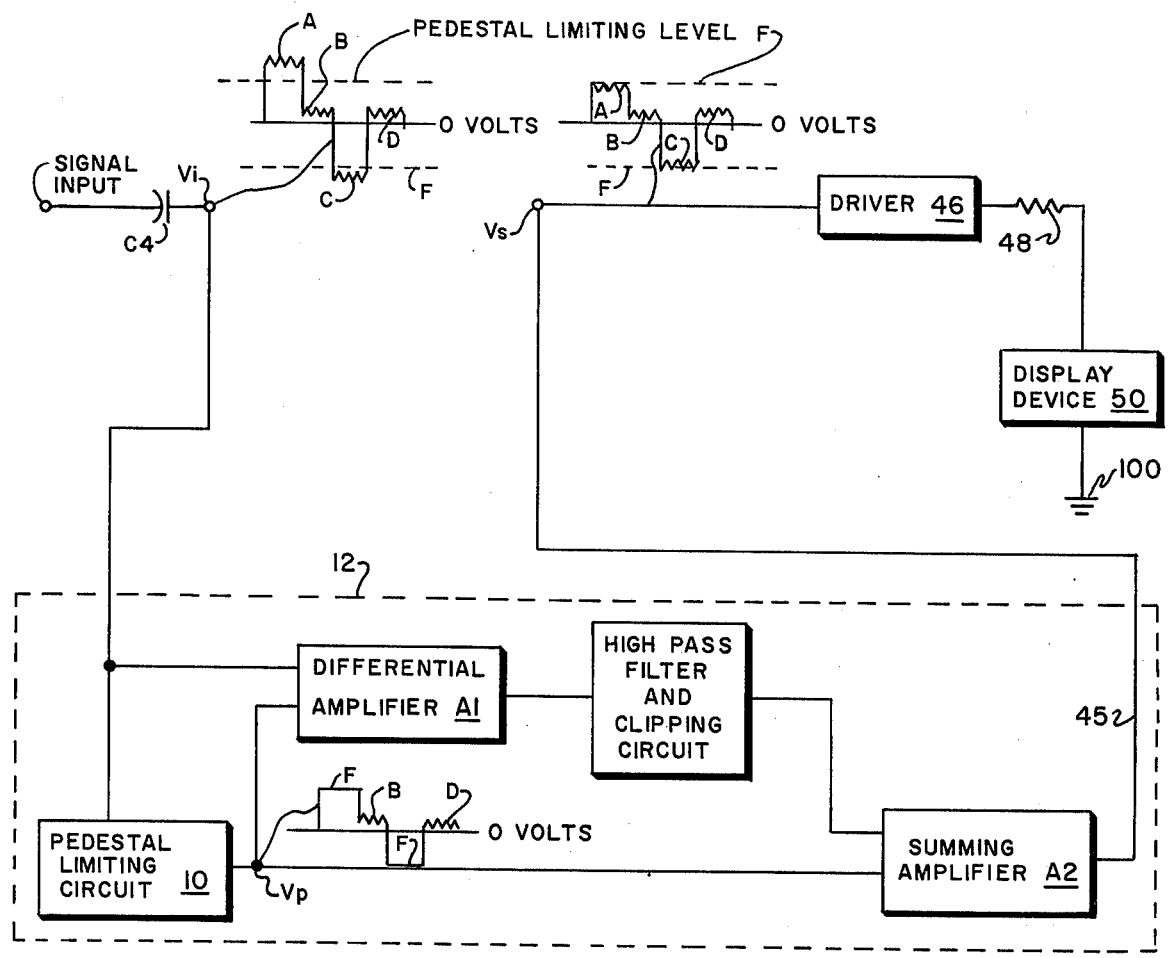
FIG. 1 shows in block diagram form a common module video channel with the present addition method low frequency gain limiting circuit connected thereto.
Figure 2A:
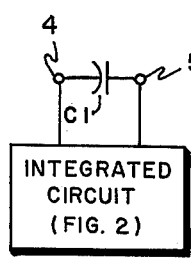
FIGS. 2 and 2A respectively illustrate an electrical schematic of a low frequency gain limiting integrated circuit and the two connections to an external capacitor.
Figure 3A:
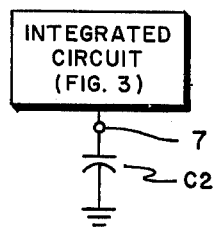
FIGS. 3 and 3A respectively illustrate a second electrical schematic of a low frequency gain limiting integrated circuit and one connection to an external capacitor.
Figure 2:
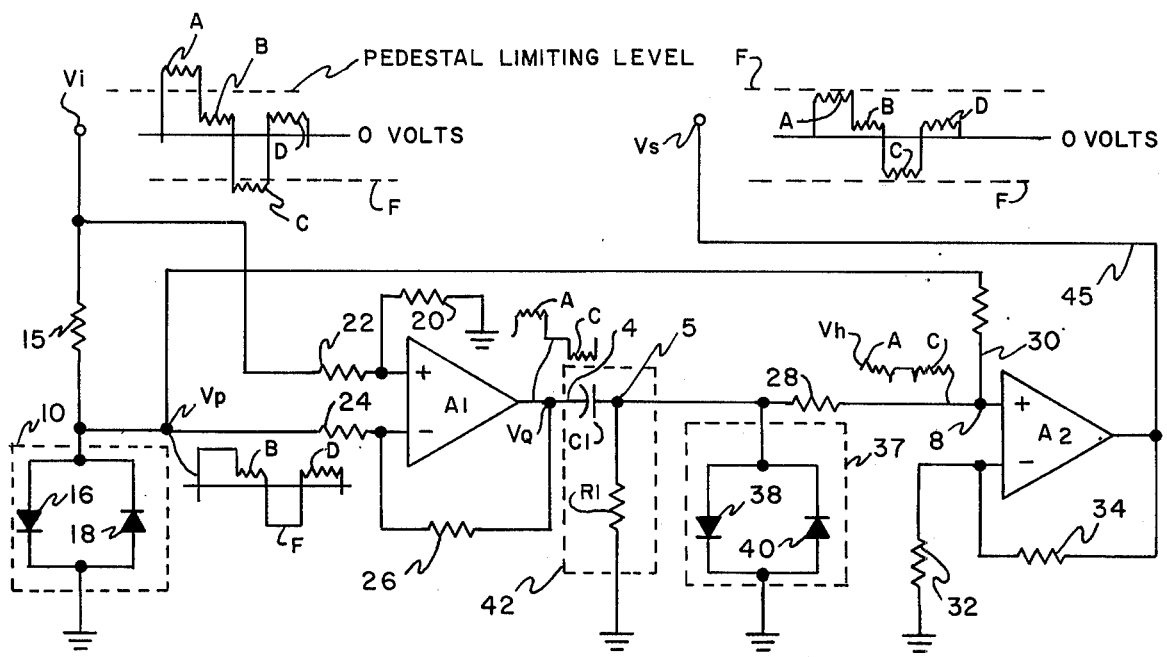
Figure 3:
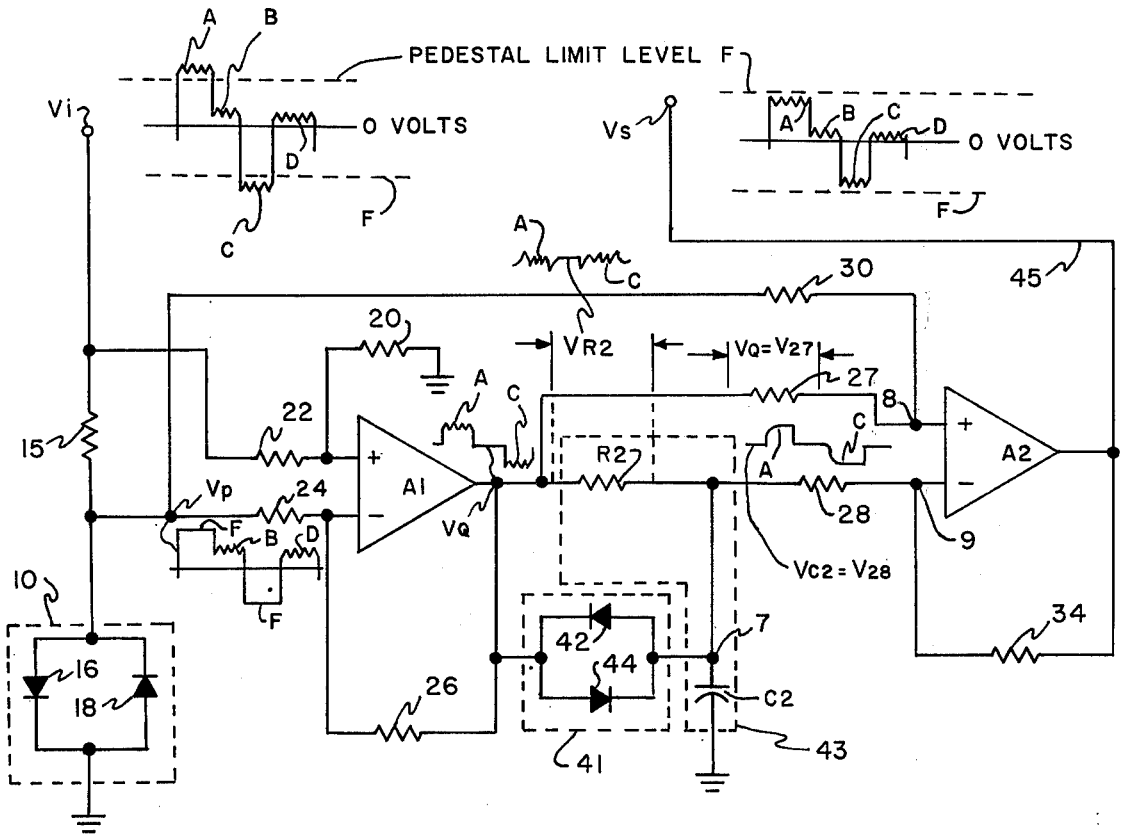

As a signal grows in intensity, such as a hotter signal in an AC coupled thermal imaging video processing system or a more intense light in an AC coupled television monitoring or cathode ray tube video processing system, the video signal increases in amplitude on each side of a brightness biasing level. Waveforms A and C, discussed hereinbelow with references to FIGS. 1, 2, and 3, represent the waveform of such an increased video signal that extends beyond the dynamic range of the AC coupled video processing system and results in a suppression streaking problem. Waveforms B and D however, remain within the dynamic range of the system. In the two embodiments of FIGS. 2 and 3, only waveforms A and C are clipped by the pedestal limiting circuit. However, it should be noted that other waveforms that could be present may go past the pedestal limiting level either in the positive or negative directions and be clipped.

FIG. 1 illustrates, in block diagram form one of a plurality of common module video channels that form an AC coupled video processing system. One of the addition method automatic low frequency gain limiting circuits 12 is shown connected between the signal input from pre and post amplifiers (not shown) and driver 46 and display device 50. The present automatic low frequency addition method gain control circuit 12 limits the height, or amplitude, of the low frequency pedestal component of the video input signal $V_i$ either in the positive or negative direction. If the input voltage $V_i$ is within the dynamic range, i.e. between pedestal limiting levels, denoted by dashed lines F, of the video processing system, then $V_i$ passes directly through the pedestal limiting circuit 10 to summing amplifier $A_2$ and out along lead 45 as an input voltage signal $V_s$ to a display device driver 46. In this case, both the low frequency pedestal and high frequency detail of signals $V_i$ and $V_s$ are identical. Actually, the limits of signal $V_i$ that pass through pedestal limiting circuit 10 is the forward threshold voltage of back-to-back diodes that are used in the two preferred embodiments, with the threshold level being the pedestal limiting level F.

Assume that the input voltage $V_i$ is outside the dynamic range of the video processing system at low frequency pedestal waveforms A and C. Waveforms A and C will be clipped by the pedestal limiting circuit 10 while waveforms B and D remain as they are. The resulting waveform is shown at terminal $V_p$ and is applied as an input to both the differential amplifier $A_1$ and to the summing amplifier $A_2$. The original, or unclipped, video signal $V_i$ is applied as a second input to differential amplifier $A_1$. The resulting short pedestal output from differential amplifier $A_1$ is only the original part of waveforms A and C that is outside the pedestal limiting level since the smooth clipped portions of $V_p$ at level F are differentially compared with the original waveforms A and C.

The short pedestal output waveforms A and C from differential amplifier $A_1$, having the original high frequency detail thereon, are passed through a high pass filter and clipping circuit to remove the short pedestal and the resulting pip voltages on the leading and trailing edges thereof to produce only the high frequency detail of waveforms A and C. The high frequency detail of waveforms A and C are applied as a second input to summing amplifier $A_2$ wherein these high frequency detail waveforms are summed on the smoothly clipped pedestal limiting level F portions of voltage $V_p$ that is applied as a second input to summing amplifier $A_2$. The output $A_2$ is a low frequency pedestal limited voltage $V_s$ that remains well within the dynamic range of the video processing system, yet the high frequency detail remains in tact. Voltage $V_s$ is applied to display driver 46 for driving individual display devices 50 for each of the automatic low frequency gain limiting circuits 12 of the video processing system.

In the addition method that is described more specifically with reference to the embodiments of FIGS. 2 and 3, the amplitude of the low frequency pedestals of input signal $V_i$ may be quite large yet be compensated for by the addition method in circuit 12 since the amplitude of signal $V_i$ out from the pedestal limiting level F is passed through the pedestal limiting circuit 10.

FIG. 2 illustrates by electrical schematic one specific addition method automatic low frequency gain limiting circuit used with an AC coupled thermal imaging video processing system. The input voltage $V_i$ is connected to the positive input of a general purpose differential amplifier $A_1$ through resistor 22 and to pedestal limiting circuit 10 through resistor 15. Circuit 10 is comprised of back-to-back diodes 16 and 18. The forward threshold voltages of diodes 16 and 18 are close to the pedestal limiting levels F on the positive and negative portions of the waveforms of voltage $V_i$, but are within the dynamic range so that the high frequency detail will not be lost by signal suppression caused by temperature differences of the targets viewed by the thermal viewer.

The smoothly clipped pedestal voltage $V_p$ is applied directly to the positive input of summing amplifier $A_2$ through resistor 30 and to the negative input of differential amplifier $A_1$ through resistor 24. Resistor 20 is of the same resistance as resistor 22, preferably 100 kilo-ohms, to provide a 1:1 voltage ratio. Feedback resistor 26 is of the same resistance as resistor 24, preferably 100 kilo-ohms, to provide a 1:1 voltage ratio.

The output of differential amplifier $A_1$ is the difference between video signal $V_i$, the original video signal from the post amplifier stage, and the clipped voltage $V_p$, which is clipped at the forward threshold of diodes 16 and 18 and is always within the dynamic range.

The output of $A_1$, denoted as voltage $V_Q$ and being short pedestal outputs, is only the portion of the low frequency pedestal still having the high frequency detail thereon, which is past the forward threshold of the diodes in the pedestal limiting circuit 10 and within the pedestal limiting level F. Voltage $V_Q$ is applied to a high pass filter 42 comprised of capacitor $C_1$ and resistor $R_1$, the result which is that the high frequency detail is retained but with short positive and negative pip voltages at the leading and trailing edges. The amplitude of the pips are limited by a clipping circuit 37 comprised of back-to-back diodes 38 and 40. The flat amplitude high frequency detail signals, herein referred to as voltage $V_h$, is then applied through resistor 28 to terminal 8 at the positive input to summing amplifier $A_2$ to be summed with the smoothly clipped pedestal voltage $V_p$ at terminal 8. The negative input to summing amplifier $A_2$ is connected to ground through resistor 32, and has feedback thereto through resistor 34 from the output. The result of summing the flat amplitude high frequency detail signed $V_h$ with the smoothly clipped pedestal of $V_p$ within summing amplifier $A_2$ is that the video signal $V_s$ is produced at the output of $A_2$ that comprises all of the original high frequency detail thereon. The video signal $V_s$ is then applied to driver 46 for driving one of a plurality of display devices 50.

The voltage across resistor $R_1$, designated as $V_{R1}$, is equal to $V_Q$ minus the voltage across capacitor $C_1$, represented as $V_{C1}$. The high frequency voltage $V_h$ is actually the voltage $V_Q$ differentiated by circuit 42 with the voltage pips clipped by clipping circuit 37.

In fabrication of the integrated circuit FIG. 2, capacitor $C_1$ must be externally connected thereto since it is about 0.068 microfarads and therefore its size is too large to be included as an integral part of the integrated circuit. Capacitor $C_1$ is externally connected to terminals 4 and 5 as shown in FIGS. 2 and 2A.

The embodiments of FIG. 3 is similar to that of FIG. 2. However, one major fabricating advantage is that capacitor $C_2$, which is also about 0.068 microfarads, is externally connected by only one lead connected at terminal 7 instead of the two lead connection for capacitor $Q_1$. The space that extra leads require sometimes cause a problem with the small integrated circuits.

Capacitor $C_2$ is a part of an RC differential circuit 43 that also comprises resistor $R_2$, preferably of 330 ohms resistance. A settling time of 0.1 microseconds or less is reached by integrator circuit 43 for limiting the leading and trailing edge voltage pips on the low frequency portions of waveforms A and C of voltage $V_Q$ at the output of differential amplifier $A_1$. Clipping circuit 41, comprising back-to-back diodes 42 and 44 clips the pip voltage off voltage $V_{R2}$, the voltage produced across resistor $R_2$. The voltage produced across Capacitor $C_2$, and therefore across resistor 28, is a smooth sharply rounded shoulder voltage shown as voltage waves $V_{C2}$ and $V_{28}$. Clipping circuit 41 provides the smooth sharply rounded shoulder of voltage $V_{28}$, which approximates the short pedestal outputs of the voltage $V_Q$ at the output of $A_1$.

The short pedestal outputs $V_Q$ are applied across resistor 27 to terminal 8 at the positive input of $A_2$ as a voltage $V_{27}$. Also, summed with voltage $V_{27}$ at terminal 8 is voltage $V_p$ applied across resistor 30. The high sharply rounded shoulder voltage $V_{28}$ is applied to the negative input of summing amplifier $A_2$. The low frequency pedestal gain limited signal $V_s$ at the output of $A_2$ is equal to the equation:

$$V_s = V_p + (V_Q - V_{C2}) = V_p + V_{R2} \qquad (1)$$

since $V_{R2} = V_Q - V_{C2}$ the same as $V_{R1} = V_Q - V_{C1}$ i the automatic low frequency pedestal gain limiting circuit of FIG. 2.

We wish it to be understood that we do not desire to be limited to the exact details of construction shown and described, for obvious modifications will occur to a person skilled in the art.

We claim:

1. An automatic low frequency pedestal gain limiting circuit for composite video signals in an AC coupled video processing system, said gain limiting circuit comprising:
   a pedestal limiting circuit for clipping the low frequency pedestal voltages of said composite video signals into smoothly clipped pedestal voltages when said low frequency pedestal voltages exceed a pedestal limiting voltage level;
   a differential amplifier having first and second inputs and an output in which said composite video signals are applied at said first input to said differential amplifier and said smoothly clipped pedestal voltages are applied at said second input to said differential amplifier wherein said video signals and said smoothly clipped pedestal voltages are differentially compared by said differential amplifier to provide short pedestal voltages having the high frequency detail of said composite video signals remaining thereon at said output of said differential amplifier;
   a summing amplifier having first and second inputs and an output;
   means for removing said short pedestal voltages and passing said high frequency detail to said first input of said summing amplifier wherein said smoothly clipped pedestal voltages are also applied to said first input to said summing amplifier for summing said high frequency detail on said smoothly clipped pedestal voltages; and
   means for providing a reference voltage at said second input to said summing amplifier to sum with said high frequency detail on said smoothly clipped pedestal voltages to provide an output video signal therefrom that retains said high frequency detail thereon but limits the gain of the low frequency pedestals to maintain operation of said video processing system within its dynamic range.

2. An automatic low frequency pedestal gain limiting circuit as set forth in claim 1 wherein said pedestal limiting circuit comprises back-to-back diodes connected in parallel between said composite video signals and ground.

3. An automatic low frequency pedestal gain limiting circuit as set forth in claim 2 wherein said means for removing said short pedestal voltages and passing said high frequency detail comprises a high pass filter and clipping circuit connected in parallel to ground between said output of said differential amplifier and said first input to said summing amplifier.

4. An automatic low frequency pedestal gain limiting circuit as set forth in claim 3 wherein said means for providing a reference voltage at said second input to said summing amplifier is a negative input connected through a resistor to ground.

5. An automatic low frequency pedestal gain limiting circuit as set forth in claim 4 wherein said high pass filter is a capacitor and resistor serially connected to ground and wherein said clipping circuit comprises back-to-back diodes connected in parallel with said resistor of said high pass filter.

6. An automatic low frequency pedestal gain limiting circuit as set forth in claim 2 wherein said means for providing a reference voltage at said second input to said summing amplifier comprises a differential circuit connected between said output of said differential amplifier and said second input to said summing amplifier for providing smooth sharply rounded shoulder voltages that approximates said short pedestal voltages at said output of said differential amplifier.

7. An automatic low frequency pedestal gain limiting circuit as set forth in claim 6 wherein said means for removing said short pedestal voltages and passing said high frequency detail comprises a direct connection through a resistor between said output of said differential amplifier and said first input to said summing amplifier for applying said short pedestal voltages having the high frequency detail thereon directly to said first input of said summing amplifier wherein said reference voltage at said second input to said summing amplifier which comprises said smooth sharply rounded shoulder voltages that approximates said short pedestal voltages having the high frequency detail thereon is subtracted from said short pedestal voltages having the high frequency detail thereon to provide an output video signal from said summing amplifier that retains said high frequency detail thereon but limits the gain of said short pedestal voltages to maintain operation of said video processing system within its dynamic range.

8. An automatic low frequency pedestal gain limiting circuit as set forth in claim 7 wherein said differential circuit more specifically comprises a resistor and capacitor wherein said resistor is connected in parallel with a clipping circuit comprising back-to-back diodes connected in parallel between said output of said differential amplifier and said second input to said summing amplifier and said capacitor is connected between said second input to said summing amplifier and ground.

* * * * *